May 11, 1948. A. REINSBERG 2,441,333
DISPLAY DEVICE FORMED OF SHEET MATERIAL
CURVED TO GIVE A FACIAL APPEARANCE
Filed April 19, 1946 2 Sheets-Sheet 1

Inventor
Adolph Reinsberg
by W. Bartlett Jones,
Attorney.

May 11, 1948.　　A. REINSBERG　　2,441,333
DISPLAY DEVICE FORMED OF SHEET MATERIAL
CURVED TO GIVE A FACIAL APPEARANCE
Filed April 19, 1946　　2 Sheets-Sheet 2
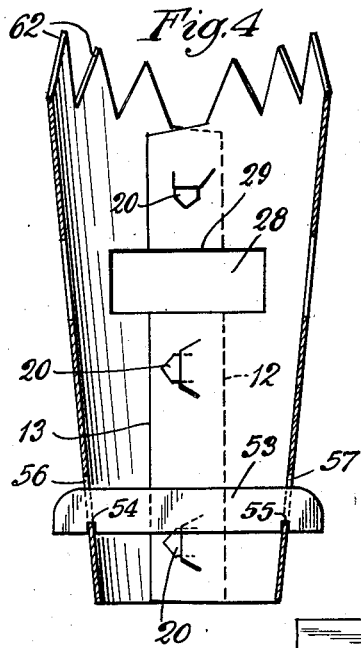
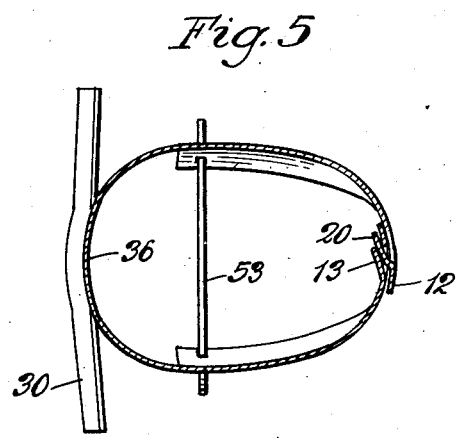
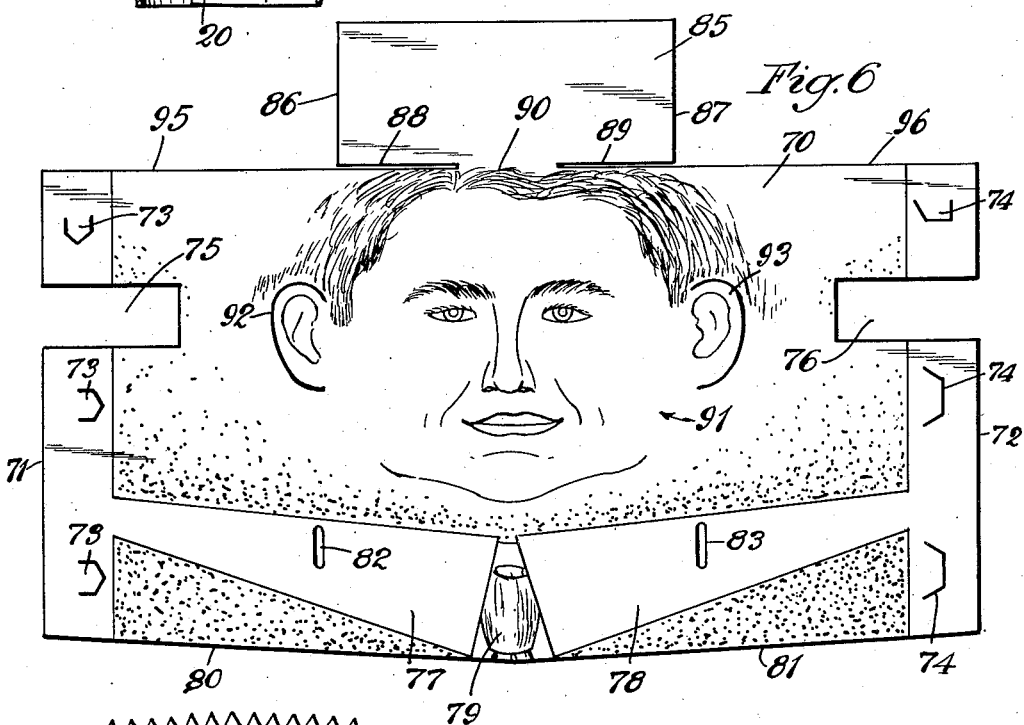
Inventor
Adolph Reinsberg
by W. Bartlett Jones,
Attorney.

Patented May 11, 1948

2,441,333

UNITED STATES PATENT OFFICE 2,441,333

DISPLAY DEVICE FORMED OF SHEET MATERIAL CURVED TO GIVE A FACIAL APPEARANCE

Adolph Reinsberg, Chicago, Ill.

Application April 19, 1946, Serial No. 663,535

5 Claims. (Cl. 40—126)

The present invention relates generally to display devices, and in particular to a flat form of sheet material to be formed and curved to give a three-dimensional facial appearance.

The invention has particular application to the display of headwear, such as hats and caps, although it has utility in the display of other merchandise, for example, scarfs, neckwear, and eyeglasses. As it is particularly illustrated and described hereinafter with reference to any use having a head covering as in displaying headgear, the form need not provide parts which simulate the dome-like portion of a human head. However, such representation may be embodied in the form within the scope of the invention, as hereinafter explained.

It is common to use molded or sculptured faces in three-dimensional forms where facial features are to be emphasized in a display. The presentation of a face in the display of merchandise is a valuable psychological expedient. However, the cost of such display devices is prohibitive for many uses. By means of the present invention a low-cost flat display form may be provided by any particular manufacturer for his particular goods, thus to assure the manufacturer of adequate display of the merchandise to the public.

It is the general object of the invention to provide a low-cost flat sheet of material so cut and figured that it may be readily curved and formed into a display device exhibiting the effect of three dimensions with respect to a human face.

It is a particular object of the invention to provide a flat form of sheet material which can be curved into a modified cylindrical form representing a human head with face, and with optional modifications to present a downwardly tapered face.

It is another object of the invention to provide a display sheet of the character described which in curved form to present a face, also presents a substantially flat panel on which may appear advertising matter.

It is another object of the invention to provide a flat display form having representations thereon of the features of a human face, optionally including automatically laterally projectable features, such as ears, and particularly characterized by laterally exaggerated facial dimensions.

Various other and ancillary objects of the invention will become apparent from the following description and explanation of the invention set forth in connection with description of the accompanying drawings, in which:

Fig. 4 is a vertical cross-section of the device looking toward the rear taken on line 4—4 of Fig. 3.

Fig. 5 is a horizontal cross-section looking downwardly taken on the line 5—5 of Fig. 3.

Fig. 6 is a modification of the device shown in Fig. 1, in which the advertising panel appears at the top of the device.

Fig. 7 is a modification of the device of Fig. 1, showing a girl's face, in which the hair-line back of the ears is cut out to project in the curved form.

Figure 1:
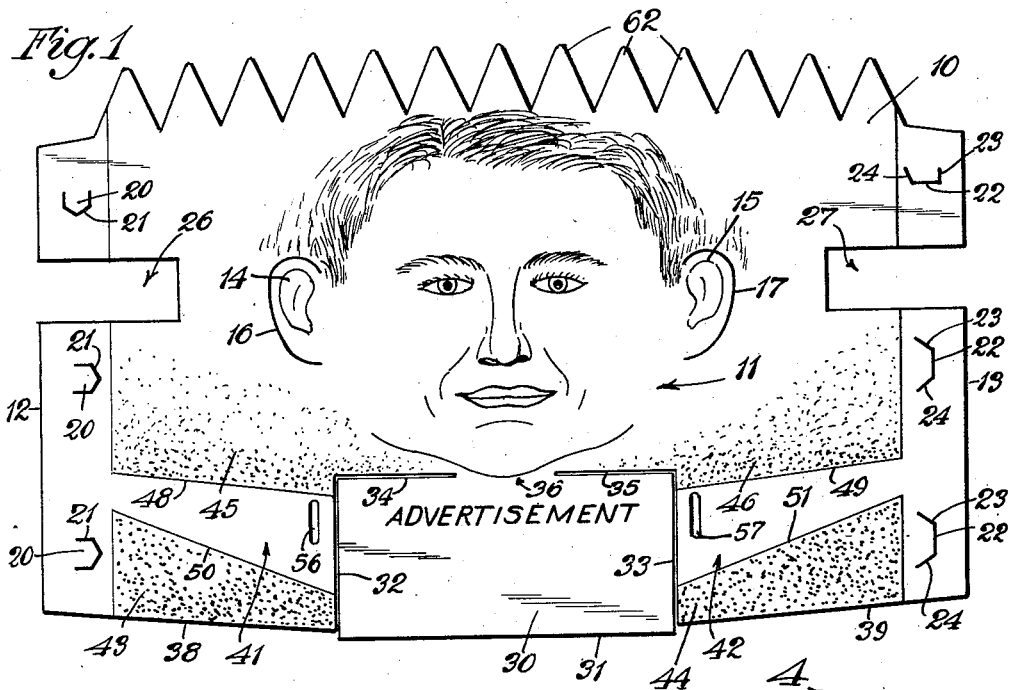
Fig. 1 is a face view of a flat sheet form of a display device.

The genesis of the invention is the provision of a flat sheet of material bearing the normal features of a human face, to be curved around a vertical axis to either opened or closed form to represent respectively a face or a human head including face. It was thereby discovered that the curved form inadequately represented the intended human face. The deficiencies were overcome after considerable experimentation artistically with human features, leading finally to exaggeration of the normal horizontal dimensions of a pictured face to the extent that normal features of a normal face would appear if a mask of such face were rectified to a plane. Resultingly, the picture of a face and its ears on a flat form would include the two ears as widely separated as the distance from one ear over the face to the other ear. In a similar way all of the normal features are horizontally exaggerated in like rectification.

Where the form is such as to include ears in the features, the form is improved by cutting through the sheet material on the outlines of ears so that when the sheet is curved to the extent necessary to simulate the rounded portion of the head behind the ears, the cut-out forms of the ears project from the curved display form in a manner simulating a normal projection of normal ears. Coupled with the appearance of the face resulting from rectification in the graphic presentation on the flat form, the whole head and face assume a three-dimensional effect in a display device.

A further improvement which is employed in the preferred form of the invention is a constriction of the bottom part of the curved form relative to the upper part. This is effective to give a non-cylindrical cross-section at the base portion, such as an oval, and hence greater curvature at the lower portion of the face. The upper portion tends to remain cylindrical, but to aid this tendency the rigidity of the form, especially of the overlapped edges, is broken by recesses into said edges forming a hole in the rear. This allows the back lower edge of a cap displayed on the form at a normal backward tilt, to slip into this opening (see Fig. 3). This permits the cap to constrict the part above the opening, back toward the cylindrical cross-section, and gives to the whole the effect of an upwardly receding back of the head, or of a "rounded" form, with a cap clinging to it. For example, in a cylindrically curved display device, an upper cross-section is roughly circular whereas the bottom cross-section is roughly oval with the pointed region in the vicinity of the chin. Thus, a downwardly tapered appearance is imparted to the face.

A further modification and improvement comprises the provision in the ultimate display form of one or more of panel portions either above or below the face or at both places, for the display of advertising and the like. This panel portion may be such as to exert a functional effect with reference to the appearance of the face, by reason of the manner in which it is defined and in part cut away from the sheet. This may be done in such a manner that the panel tends to remain flat while the remainder of the sheet assumes a curved form. A portion of the panel is connected to the body portion having the face, for example, at the bottom of the face, as at the underside or the lower portion of the chin. The effect is that the flatness retained by the panel is partly carried into the face to give a flattened appearance in the vicinity of the connection to the panel. Where this flattened face portion is a constricted portion as above described for the chin, the flatness thus derived is in compensation for what otherwise would be a too-rounded effect, resulting from the aforementioned constriction.

The bottom edge of the sheet may be cut in a manner to give any required footing, or tilt, to the curved display form. When the panel is at the bottom, the sheet edge is cut with reference to a straight bottom edge of the advertising panel portion, so that when the form is curved around a substantially vertical axis a backward incline or tilt is given to the vertical axis and the form, thereby to improve the display effect.

Where caps or other covering are placed on the form, the top edge is hidden, and its character is less important than in other circumstances. However, especially for display of light weight material on the form, it is preferred that the top edge be modified, as for example, by being serrated or otherwise provided with numerous tab-like projections which can be bent inwardly and upwardly of the final form to take away the sharp edge which otherwise would be presented by a straight edge of the flat form. If desired these tab-like projections may be specially formed so as to come together to complete a dome-like shape, much like the pointed sections or segments of an ordinary cap, or the surfaces of orange sections, come together to a central point.

Fig. 1 shows one example of the invention particularly designed for the display of caps. The flat sheet 10 is of heavy cardboard suitable for being bent into substantially cylindrical form. Its shape is generally rectangular, but slightly modified from exactness in that respect as will appear hereinafter. The surface of sheet 10 is such as to receive indicia, such as embossing, printing, lithographing or other type, to represent a face and other features. Numeral 11 generally represents a human face suitably impressed on the sheet substantially midway between side edges 12 and 13 of the sheet 10. The face is located generally in the upper portion of the sheet 10. It will be observed that the ears 14 and 15 are abnormally located on the sheet 10, the horizontal distance being exaggerated, and such that when the sheet is curved as desired, the ears become located substantially in normal position on the simulated head. The other features of the face are proportionally exaggerated in their horizontal dimensions in substantial rectification of the facial features from the ultimate curved form to the flat form of Fig. 1. The heavy lines 16 and 17 defining the outlines of ears 14 and 15 are cut through sheet 10 forming the similarly designated edges appearing especially in Fig. 2.

The lateral edges 12 and 13 are provided with means for interengaging them to hold the sheet 10 in closed contour form. These means are cooperative tabs and slots formed in the sheet 10 by suitable cutting operations. Inwardly from the lateral edge 12 a suitable number of pointed tabs are formed extending either in a vertical direction or in a horizontal direction, by reason of a substantially U-shaped cut 21. Inwardly from the opposite edge 13 there are slots made to receive the tabs 20. These slots are formed in such a manner by cuts 22, each sufficiently long to receive the tabs 20, each cut 22, preferably being extended by two mutually flaring cuts 23 and 24, to form wide receiving slots which facilitate mechanical insertion of tabs 20 into the angular slot formed by the cuts 22—23—24. These tabs and slots are merely exemplary of any mechanical expedient to join the sides. For reasons pointed out hereinafter, it is preferred that the upper tab 20 be vertical rather than horizontal.

Both of the edges 12 and 13 are shown recessed at 26 and 27, respectively, in such a manner that the recesses 26 and 27 come together in curving the sheet into closed contour form. These recesses form an opening in the back designated 28 in Figs. 3 and 4, and providing top edge 29. The opening 28 is effective to break the rigidity of the overlapped edges 12 and 13, and permit the portion of the head above the opening to be flexed more freely than the portion below it. As later described, this opening has a function related to the constricted bottom portion.

Figure 2:
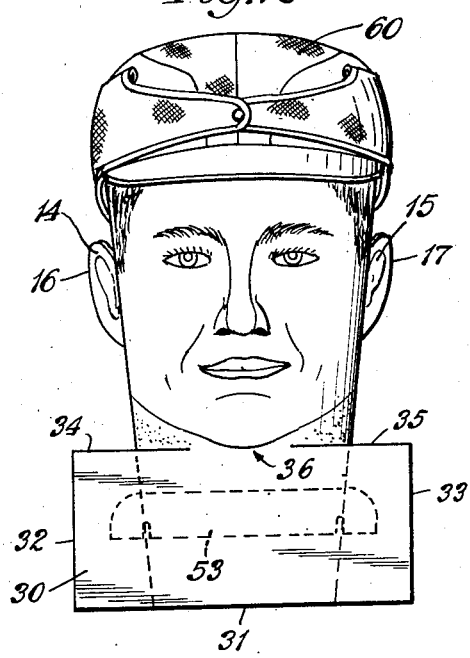
Fig. 2 is a front view of the device of Fig. 1 folded into ultimate form, showing the device in use to display a cap.
Figure 3:
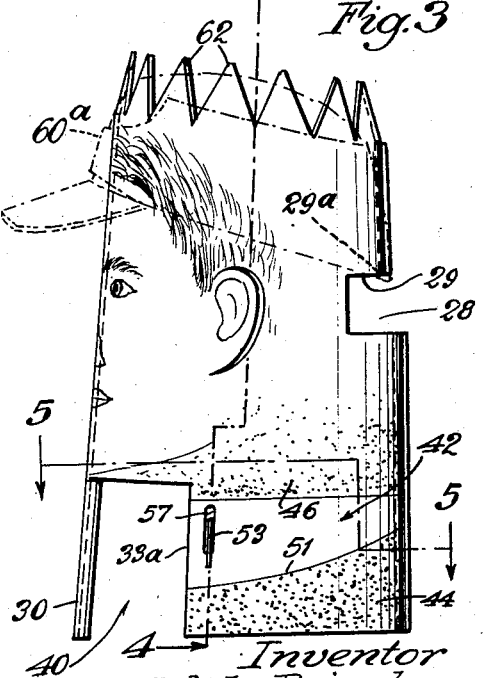
Fig. 3 is a side view of the display device of Fig. 2, but without the cap.

Beneath the face there is an advertising panel integral with the remainder of sheet 10, but so arranged that it remains substantially flat when the sheet 10 is locked into curved form. The panel is designated 30, and, as shown, is located at the bottom edge 31 of the sheet 10. The panel 30 is defined laterally by two spaced vertical cuts 32 and 33 inwardly of the sheet from the edge 31. These cuts 32 and 33 extend into the sheet substantially to the horizontal line of the chin of face 11, and then are extended substantially horizontally by the cuts 34 and 35 which approach each other toward the chin in such a manner as to leave to a connecting portion 36 of the sheet 10 between the panel 30 and the face-area of the sheet. Thus, on curving the sheet 10 into closed form the panel remains substantially flat as shown in Figs. 2, 3 and 5. Advertising or other material may be presented on the panel 30. The connecting portion 36 by which the panel joins the sheet, serves to a degree as a flattening means, in the form shown, to give a slight flattened effect to the chin as indicated more clearly by the numeral 36 in Fig. 5.

Laterally of the panel 30 in Fig. 1 the bottom edge of the sheet 10 is slightly raised from the line of edge 31, and therefrom upwardly inclined, in order to give the curved form a slight backward tilt best shown in Fig. 3. This is readily done by providing linear upwardly inclined bottom edges 38 and 39 which join the cuts 32 and 33 at points slightly above the horizontal bottom edge 31 of panel 30. This slight distance is related to the open space shown in Fig. 3 and designated 40, between the panel 30 and the edge 33a.

It will be observed that the sheet 10 in addition to having the representation of a face 11 thereon has lighter colored or white areas 41 and 42 particularly defined by lower darker areas 43 and 44, respectively, and by upper darker areas 45 and 46, respectively. The latter areas 45 and 46 in the lithographing or other form of indicia, are preferably shaded off in color into the background and face portions, and in a manner to leave sharp boundary lines 48 and 49 which in the ultimate device aid in giving an approximation or impression of a white collar on the figure. Likewise the dark areas 43 and 44 provide sharp boundary lines 50 and 51 at the lower edges of white regions 41 and 42, thus to give the impression of a coat on the figure in part covering a collar. This impression of a collar is more completely carried out in the modified form of Fig. 6.

In order to give the tapered appearance to the face as illustrated by Fig. 2, means are provided to constrict the cross-section to less than a chord-distance corresponding to a truly cylindrical cross-section, which otherwise would result by uniting edges 12 and 13 shown in Fig. 1. The preferred means is a cardboard link 53 (Fig. 4) having slots 54 and 55 cut into it. The strip or link 53 passes through slots 56 and 57 (Fig. 1) cut into the sheet 10, in the collar region as shown in Fig. 1. The slots 54 and 55 in the chord-strip 53 have a width suitable to engage the thickness of the sheet 10, as shown in Fig. 4. The distance between the slots 54 and 55 is less than the normal chord-length of a cylinder between the slots 56 and 57 as a result of which the form is constricted to an oval shape at the bottom (illustrated by Fig. 5), whereas at the top it remains substantially cylindrical in cross-section. This gives the face view the tapered appearance shown in Fig. 2, and also results in the broader base in the lateral view Fig. 3.

The constriction to oval cross-section at the bottom tends to carry upwardly to the top, which would have a circular cross-section except for the constricting element 53. However, the opening 28 breaks this upward tendency and gives the upper portion a flexibility in part independent of the constricted bottom portion. The opening 28 is located as shown so that the top edge 29 may function to engage the rear back edge of a cap set on the device at a backward tilt. Such a positioning is indicated by a cap in dotted lines in Fig. 3. The full lines show the form as it assumes a shape on folding and before a cap is mounted on it. The dotted line 60a shows the cap at a backward tilt with its rear back edge engaged by the edge 29 at position 29a, thus tending to round the top and drawing the back inwardly to give the impression of a rounded back of the head and the cap clinging to it. The tab 20 and slot 22—23—24 above the opening 28 are preferably located to function vertically, thus to maintain rigidity of engagement when the form may be horizontally squeezed in placing a hat on the form. A tab and slot above opening 28 functioning in a horizontal direction as shown for the tabs below the opening 28, tend to open up in placing a hat on the form.

Where the sheet 10 is particularly designed for the display of headgear, such as the cap 60 in Fig. 2, the top edge of the sheet need not be completed in completing the representation of a three-dimensional head. However, in order to avoid a sharp edge, and to permit slightly inwardly and upwardly tapering regions on the form, the top edge is serrated providing projections or large teeth 62, which can be mechanically bent inwardly as desired. These may be modified in shape according to the type of headgear to be displayed. The teeth 62 may be made much longer than shown in order to be brought together to a point like the segments of a sphere, in representation of the dome-like portion of a head. However, in the illustrative device of Fig. 1 designed for the cap 60 shown in Fig. 2, the top edge is not particularly important as to its exact form.

In other uses of the display device, for example where caps or headgear are not to be displayed, the top edge of the sheet may be made to carry the advertising panel, thus to dispense with any necessity for completing the form into a dome-like character. This is represented in Fig. 6. This shows a display form which might be used for the display or scarfs. Since these would normally cover the location of the panel 30 in Fig. 1, the advertising panel is placed at the upper extremity of the face. In Fig. 6 the sheet 70 has lateral edges 71 and 72 respectively provided with tab 73 and slots 74, and with lateral recesses 75 and 76, all as described with reference to Fig. 1. In omitting the panel portion at the bottom, the portions simulating a collar, such as the areas 77 and 78 are completed and the representation of a necktie 79 is added. The bottom edge of the sheet 70 has relatively upwardly tapering portions 80 and 81 which give to the curved form a tilt such as that shown in Fig. 3. The collar areas have a pair of slots 82 and 83 for the receipt of a constricting strip, such as that shown in Fig. 3, and for the same purpose to give a downwardly tapering frontal face appearance. The top edge has advertising panel 85 defined laterally by the substantially vertical sheet edges 86 and 87, which are extended by the cuts 88 and 89, respectively in a horizontal direction toward each other, so as to leave a connecting portion 90 of the sheet between the panel 85 and the facial portion 91. This latter likewise has ears defined by cuts 92 and 93. In the form shown, cuts 88 and 89 which define the bottom portion of the advertising panel 85, are extended as the remaining top edges 95 and 96 of the sheet form 70. When curved into display position the advertising panel 85 substantially hides from view the edges 95 and 96, and the lack of a completing dome shape to the head is not obvious.

Fig. 7 represents a girl's face on a form like Fig. 1, but modified in the respect that the cut outline of the ear of Fig. 1 is changed to the cut hair-line representing that portion of the hair visible as a lateral projection in a face view.

The principal changes in Fig. 7 are the girl's face 98 and the cuts 99 through the sheet on the hair-line. In folding the form the cut portion projects rearwardly and the effect may be exaggerated by slight bending outwardly.

In setting up either of the forms shown in Fig. 1 or Fig. 6, the lateral edges are interlocked by fitting together the cooperating tabs and slots, thus to provide an overlapping seam at the rear containing a hand-hole or opening, such as already described. The bottom portion is then pinched together manually as the strip 53, or other such means, is inserted into the slots therefore to constrict the cross-section into oval-like form. The ears of the device naturally project to a slight degree automatically, but the ear affect may be heightened by mechanically bending the sheet material to increase the angle normally assumed in curving the form. In the form of Fig. 1, the serrated portion 62 at the top may be mechanically bent inwardly to the extent desired according to their length and shape.

The device is useful for the display of many articles of merchandise. When the form of Fig. 6 is used, for example, in the display of scarfs, the ends of constricting link 53 (Fig. 5), which project laterally from the form, may be made such as to serve as retaining elements for the scarf, or the form may be altered otherwise according to what is being displayed.

As set forth above, the invention may be used in various simpler forms without the refinements exemplified in the preferred device, and the invention is subject to other modifications and changes falling within the scope of the appended claims.

I claim:

1. A display device comprising a generally rectangular piece of sheet material relatively long horizontally and narrow vertically adapted to be curved into substantially cylindrical form about a vertical axis to represent a human head, the side edges being cooperatively cut to provide mutually engaging means to hold the said sides in overlapping position to maintain said cylindrical form, said sheet bearing substantially midway between said sides and in the upper portion features in representation of a human face but with the horizontal dimensions of the face abnormally elongated in rectification, said sheet having cuts outlining the edges of ears forming part of said features for projection from said form in simulation of ears, and means to constrict the lower and front region in the vicinity of the chin into a chord-distance less than that corresponding to a true cylinder, whereby to give the face on the form a downwardly tapered appearance, the bottom portion of the sheet having a panel portion generally below the chin defined and bounded laterally by two spaced cuts in the sheet upwardly from the bottom edge and on the top by substantially horizontal extensions of said cuts toward each other so as to leave an intervening uncut portion connecting the resultingly defined panel to the face in the vicinity of the chin, whereby said panel and said uncut portion tend to flatten the lower portion of the face in the cylindrical form and said panel is presented substantially flatwise for display of advertising.

2. A display device comprising a piece of sheet material adapted to be curved about a vertical axis to represent at least a face portion of a human head, said sheet bearing graphic features in representation of a human face but with the horizontal dimensions of the face abnormally elongated in rectification, and means to constrict the lower and front region of the curved form in the vicinity of the chin, whereby to give the face on the form a downwardly tapered appearance, the bottom portion of the sheet having a panel portion generally below the chin defined and bounded laterally by two spaced cuts upwardly from the bottom edge of the sheet and on the top by substantially horizontal extensions of said cuts toward each other so as to leave an intervening uncut portion connecting the resultingly defined panel to the face in the vicinity of the chin, whereby said panel and said uncut portion tend to flatten the lower portion of the face in the curved form and said panel is presented substantially flatwise for display of advertising.

3. A display device comprising a piece of sheet material adapted to be curved about a vertical axis to represent at least a face portion of a human head, said sheet bearing features in representation of a human face but with the horizontal dimensions of the face abnormally elongated in rectification, said sheet having cuts outlining the edges of ears forming part of said features for projection from said form in simulation of ears, and means to constrict the lower and front region of the curved form in the vicinity of the chin whereby to give the face on the form a downwardly tapered appearance, the bottom portion of the sheet having a panel portion generally below the chin defined and bounded laterally by two spaced cuts upwardly from the bottom edge of the sheet and on the top by substantially horizontal extensions of said cuts toward each other so as to leave an intervening uncut portion connecting the resultingly defined panel to the face in the vicinity of the chin, whereby said panel and said uncut portion tend to flatten the lower portion of the face in the curved form and said panel is presented substantially flatwise for display of advertising, the lower edge of said panel portion and the outward edge regions of the sheet being in a straight line, and the two intervening portions of the bottom edge being inclined slightly upwardly toward the panel, whereby to give a backward tilt to the curved form.

4. A display device comprising a piece of sheet material adapted to be curved about a vertical axis to represent at least a face portion of a human head, said sheet bearing features in representation of a human face but with the horizontal dimensions of the face abnormally elongated in rectification, an edge of the sheet having a panel portion at a vertical extremity of the face portion, said panel portion being defined and bounded laterally by two spaced and generally vertical edge of the sheet material and also defined and bounded inwardly of the sheet by generally horizontal extensions of said two spaced edges which extensions approach each other so as to leave an intervening uncut portion connecting the panel to the face, whereby said uncut portion serves to flatten the face in the curved form and said panel is presented substantially flatwise for display of advertising.

5. A display device in flat sheet-like form to be curved into a closed-contour form around a vertical axis to simulate a portion of a human head including the face portion, said form bearing human facial features, the said features having laterally exaggerated and substantially rectified dimensions whereby the distance apart of the ear locations approximates the distance measured from one ear location over the face to the other ear location, and means to hold the bottom portion of the face in narrower form relative to the upper portion of the face whereby to present a downwardly tapering type of face, the form being cut to provide an opening in the back substantially in line with the ear location, whereby the top portion above said opening is rendered more flexible than the constricted portion below said opening for permitting said top portion to be deformed toward circular cross-section to give to the form an upwardly and forwardly receding back head portion.

ADOLPH REINSBERG.

REFERENCES CITED

The following references are of record in the file of this patent:

UNITED STATES PATENTS

| Number | Name | Date |
|---|---|---|
| 585,092 | Gibson | June 22, 1897 |
| 1,899,282 | Long | Feb. 28, 1933 |
| 2,016,473 | Wittcoff | Oct. 8, 1935 |
| 2,023,473 | Schwartz | Dec. 3, 1935 |

FOREIGN PATENTS

| Number | Country | Date |
|---|---|---|
| 11,092 | Great Britain | May 27, 1905 |